(12) United States Patent
Kozlenok

(10) Patent No.: US 11,608,254 B2
(45) Date of Patent: Mar. 21, 2023

(54) LIFTING APPARATUS SUPPORTED BY TWO WHEEL AUTOMATIC GUIDED VEHICLES

(71) Applicant: Arrival Limited, London (GB)

(72) Inventor: Aleksandr Kozlenok, London (GB)

(73) Assignee: Arrival Limited, London (GB)

( * ) Notice: Subject to any disclaimer, the term of this patent is extended or adjusted under 35 U.S.C. 154(b) by 539 days.

(21) Appl. No.: 16/833,056

(22) Filed: Mar. 27, 2020

(65) Prior Publication Data

US 2020/0307973 A1 Oct. 1, 2020

(30) Foreign Application Priority Data

Mar. 29, 2019 (GB) ..................................... 1904413

(51) Int. Cl.
*B66F 9/06* (2006.01)
*B66F 7/06* (2006.01)
*G05D 1/02* (2020.01)

(52) U.S. Cl.
CPC .............. *B66F 9/063* (2013.01); *B66F 7/065* (2013.01); *G05D 1/021* (2013.01); *G05D 2201/02* (2013.01)

(58) Field of Classification Search
CPC ......... B66F 9/063; B66F 7/065; G05D 1/021; G05D 2201/02
See application file for complete search history.

(56) References Cited

U.S. PATENT DOCUMENTS

| | | | |
|---|---|---|---|
| 4,977,971 A | 12/1990 | Crane, III et al. | |
| 2008/0105481 A1 | 5/2008 | Hutcheson et al. | |
| 2009/0104007 A1 | 4/2009 | Umezawa et al. | |
| 2014/0169930 A1 | 6/2014 | Messmann et al. | |

FOREIGN PATENT DOCUMENTS

| | | |
|---|---|---|
| CN | 109019434 | 12/2019 |
| DE | 102013018268 | 4/2015 |

OTHER PUBLICATIONS

Extended EP Search Report for corresponding EP Patent Application No. 20166833.2 dated Aug. 27, 2020, 8 pages.
GB Search and Examination Report for corresponding GB Patent Application No. GB1904413.0 dated Sep. 26, 2019, 5 pages.

*Primary Examiner* — Mathew Franklin Gordon
(74) *Attorney, Agent, or Firm* — Lee & Hayes, P.C.; Beatrice L. Koempel-Thomas

(57) ABSTRACT

A mobile lifting apparatus has a platform coupled to elongated lifting arms arranged in a crossed configuration with a hinge at center portions of the lifting arms which allows the lifting arms to rotate in a crossed scissor manner when the platform is raised or lowered. The lower ends of the lift arms are coupled to automatic guided vehicles which move towards each other to raise the platform and move away from each other to lower the platform. A locking mechanism coupled to the lifting arms is actuated to prevent movement of the lifting arms to lock the height of the platform.

16 Claims, 5 Drawing Sheets

LIFTING APPARATUS SUPPORTED BY TWO WHEEL AUTOMATIC GUIDED VEHICLES

This Application claims priority to GB Application 1904413.0, filed on Mar. 29, 2019, which is incorporated herein by reference.

FIELD OF INVENTION

The field of invention is the physical operation of the technological processes, product design and assembling optimizations in robotized manufacturing.

BACKGROUND

Scissor lift equipment has been used to raise and lower platforms. The scissor lift can have lift arms arranged in a crossed configuration with a hinge coupled to center portions of the lift arms. Upper ends of the lift arms can be coupled to a platform and lower ends of the lift arms can be coupled to a single unitary moveable structure having wheels. Actuators coupled to the lift arms are used to move the lift arms between a more horizontal orientation and a more vertical orientation. The platform is lowered when the lift arms are in the horizontal orientation and the platform is raised when the lift arms are in the vertical orientation.

A common disadvantage of the existing scissor lift equipment is that they require an additional dedicated lifting mechanism for moving the lift arms and lifting a platform. The lifting mechanism might be hydraulics or electrical motors, incorporated into the design of the automatic guided vehicle (AGV) in a linear actuator. The lifting mechanism is an additional structure that requires a power supply and maintenance. What is needed is a simplified lift apparatus which does not require the dedicated lifting mechanism.

SUMMARY OF THE INVENTION

A mobile lifting apparatus has a platform coupled to elongated lifting arms which raise and lower the platform. Two AGVs are controlled by an AGV controller to move the mobile lifting apparatus to any destination. The platform is raised and lowered based upon the distance between the two AGVs. The two AGVs can be coupled to lift arms that support a center line of the platform. The AGVs can have rotational couplings which extend from an upper surface of the AGVs to the lift arms. Upper ends of the lift arms can be coupled to a lower surface of the platform. For example, the upper end of the first lift arm can be coupled to a hinge fixed to an end portion of the platform and upper ends of the second and third lift arms can be coupled to a slide mechanism on an opposite side of the platform. The slide allows the upper ends of the second and third lift arms to move inward towards the center line when the platform is raised and outward when the platform is lowered.

The lifting arms can be arranged in a crossed pattern with an upper end of a first lifting arm coupled to a hinge on one end of the platform and upper ends of the second lifting arm and the third lifting arm coupled to a second end of the platform opposite the first end. The center portions of the lifting arms are coupled to a hinge which allows the lifting arms to rotate in a crossed scissor manner when the platform is raised or lowered. A locking mechanism can be attached to the lifting arms to prevent the platform from dropping accidentally if there is a power failure or an AGV control failure. In an embodiment, the locking mechanism can be attached to the center hinge portion of the lifting arms. In another embodiment, the locking mechanism can be attached to the slide for preventing movement of the upper ends of the second and third lifting arms.

DETAILED DESCRIPTION

Figure 1:
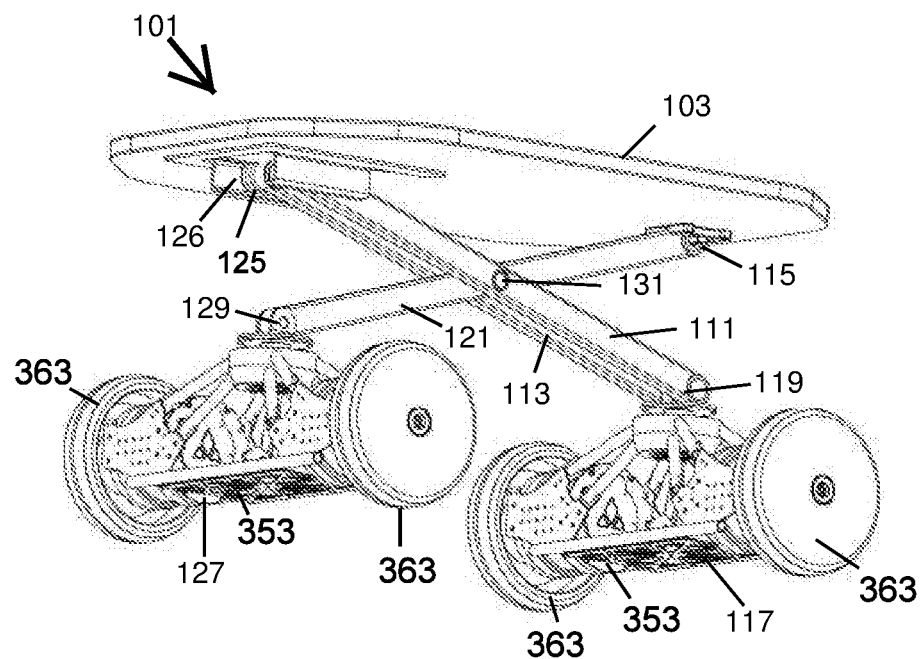
FIG. 1 illustrates a perspective view of a lift platform on two AGVs.

FIG. 1 illustrates a lower perspective view of an embodiment of a mobile lifting apparatus 101 having a platform 103 coupled to elongated lifting arms 111, 113, 121 which raise and lower the platform 103. In this example, the lifting arms 111, 113, 121 are arranged in a crossed pattern with an upper end of a first lifting arm 121 coupled to a hinge on one end of the platform 103 and upper ends of the second lifting arm 111 and the third lifting arm 113 are coupled to a second end of the platform 103 opposite the first end. The second lifting arm 111 and the third lifting arm 113 are parallel to each other and the first lifting arm 121 can be positioned between the second lifting arm 111 and the third lifting arm 113. Center portions of the lifting arms 111, 113, 121 are coupled to an arm hinge 131 which allows the first lifting arm 121 rotate about the arm hinge 131 relative to the second lifting arm 111 and the third lifting arm 113.

In the illustrated example, the upper end of the first lift arm 121 is coupled to an upper hinge 115 which allows the first lift arm 121 to rotate relative to the platform 103. The lower end of the lift arm 121 is coupled to a first lower hinge 129 which allows the first lift arm 121 to rotate about a horizontal axis relative to a first AGV 127. The lower ends of the second lift arm 111 and the third lift arm 113 are coupled to a second lower hinge 119 which allows the second lift arm 111 and the third lift arm 113 to rotate about a horizontal axis relative to a second AGV 117. A vertical coupling in the first AGV 127 allows the first lift arm 121 and the first lower hinge 129 to rotate about a vertical axis relative to the first AGV 127. A vertical coupling in the second AGV 117 allows the second lift arm 111 and third lift arm 113 to rotate about a vertical axis relative to the second AGV 117. In an alternate embodiment, the third lift arm 113 is parallel to the first lift arm 121 rather than the second lift arm 111, with the upper end of the third lift arm 113 coupled to the hinge 115 on the lower front portion of the platform 103 and a third lower end coupled to the first AGV 127.

The upper ends of the second lifting arm 111 and the third lifting arm 113 are coupled to a slide 125 which slides within a track 126 that extends along a portion of the length of platform 103. The slide 125 is coupled to the upper ends of the second lifting arm 111 and the third lifting arm 113. The track 126 can securely hold the slide 125 and the upper ends of the second lifting arm 111 and the third lifting arm 113 to the bottom of the platform 103. In an embodiment, the track 126 can have two "C" shaped cross section rails, positioned on opposite outer sides of the slide 125 which moves within the track 126, which prevent the slide 125 from separating vertically from the platform 103.

The slide 125 moves within the tracks 126 and can have various designs. In another embodiment, the slide 125 can have surfaces, which slide against the track 126, made of a low friction material such as Teflon, Delrin, or other lubricious polymer materials. In other embodiments, the slide 125 can have wheels, bearings or bushings which roll with low friction movement against the tracks 126. In other embodiments, any other sliding mechanism can be used which couples the upper ends of the second lifting arm 111 and the third lifting arm 113 to the platform 103 and allows for the described movement.

The mobile lifting apparatus 101 is supported by two separate wheeled robots which can be automatic guided vehicles (AGVs) 117, 127 which operate independently and are not rigidly coupled to each other. In the illustrated example, the AGVs 117, 127 can each have two wheels 363 which are each driven by an electric motor 353. In an embodiment, the electric motors 353 can be brushless direct current (BLDC) motors. The motors 353 are powered by rechargeable batteries and controlled by a motor controller. The motor controllers can include a main controller circuit and electrical power switching mechanisms. The motor controllers can include a general purpose central processing unit (CPU) such as an Arduino controller and general purpose input/output (GPIO) mounted drivers. The CPUs might also play a role of the controlling unit for additional devices such as lift locks, cameras, sensors, etc. mounted on the mobile lifting apparatus 101.

The AGVs can also include communication means with wireless networks. For example, the communications mechanism can be a radio frequency (RF) device such as a Wi-Fi mechanism or any other RF communications transceiver system. These controls can be used to alter a separation distance between the two AGVs used with each platform to raise and lower the platform. In an embodiment, a system controller can transmit navigational controls to a plurality of AGVs and each AGV can transmit location information back to the system controller for feedback for the locations of the plurality of AGVs. In order to turn each AGV, one wheel can be rotated faster than an opposite wheel. For example, when a left wheel is rotated faster than a right wheel, the AGV will turn right. The AGV can rotate freely under the platform. A rear AGV can be controlled to remain in a fixed orientation and alighted with the platform so the rear AGV follows a front AGV. In an embodiment, the AGVs can move a payload placed on the platform to a payload loading/unloading location. The platform can be moved vertically as described above to a desired height and a robot mechanism can load or unload the payload from the platform.

Figure 2:
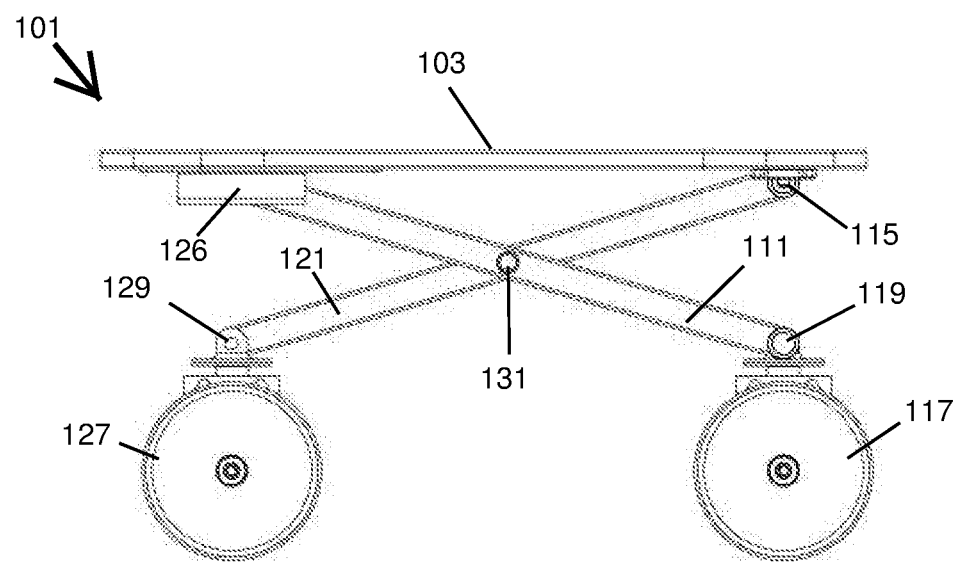
FIG. 2 illustrates a side view of a lift platform in a raised position on two AGVs.

FIG. 2 illustrates a side view of the mobile lifting apparatus 101 in the lifted platform 103 configuration. The hinges can each have a rotational axis which is perpendicular to the illustrated length of the platform 103 and parallel to each other. The upper ends of the second lift arm 111 and the third lift arm 113 are coupled to the slide. In the raised position, the slide, the upper ends of the second lift arm 111 and the third lift arm 113 move inward towards the center of the platform 103. Similarly, the AGV 127 moves inward towards the center of the platform 103.

Figure 3:
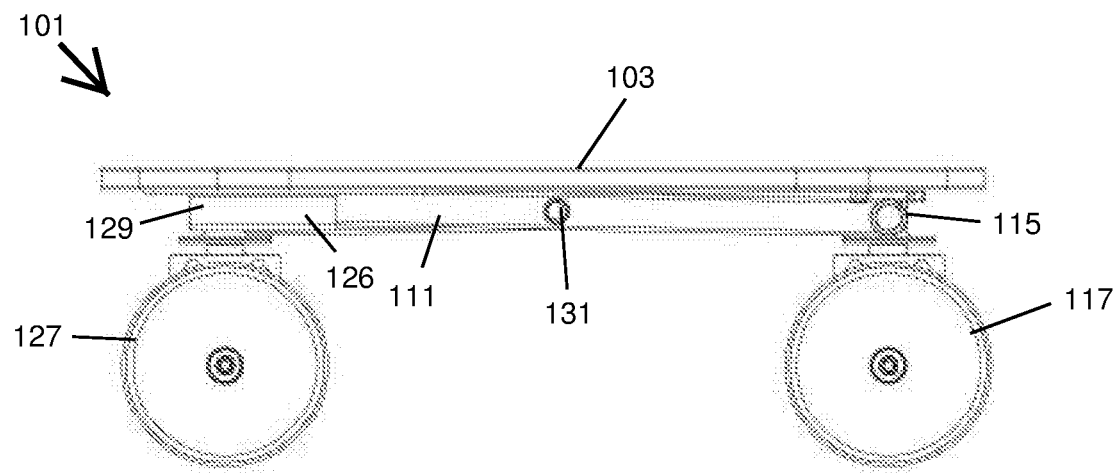
FIG. 3 illustrates a side view of a lift platform in a lowered position on two AGVs.

FIG. 3 illustrates a side view of the mobile lifting apparatus 101 in the fully lowered platform 103 configuration. In the lowered position, the slide and the upper ends of the second lift arm 111 and the third lift arm 113 are moved outward towards an end of the platform 103. In this example, the first lift arm 121, the second lift arm 111, and the third lift arm 113 are all in a horizontal and parallel orientation.

Figure 4:
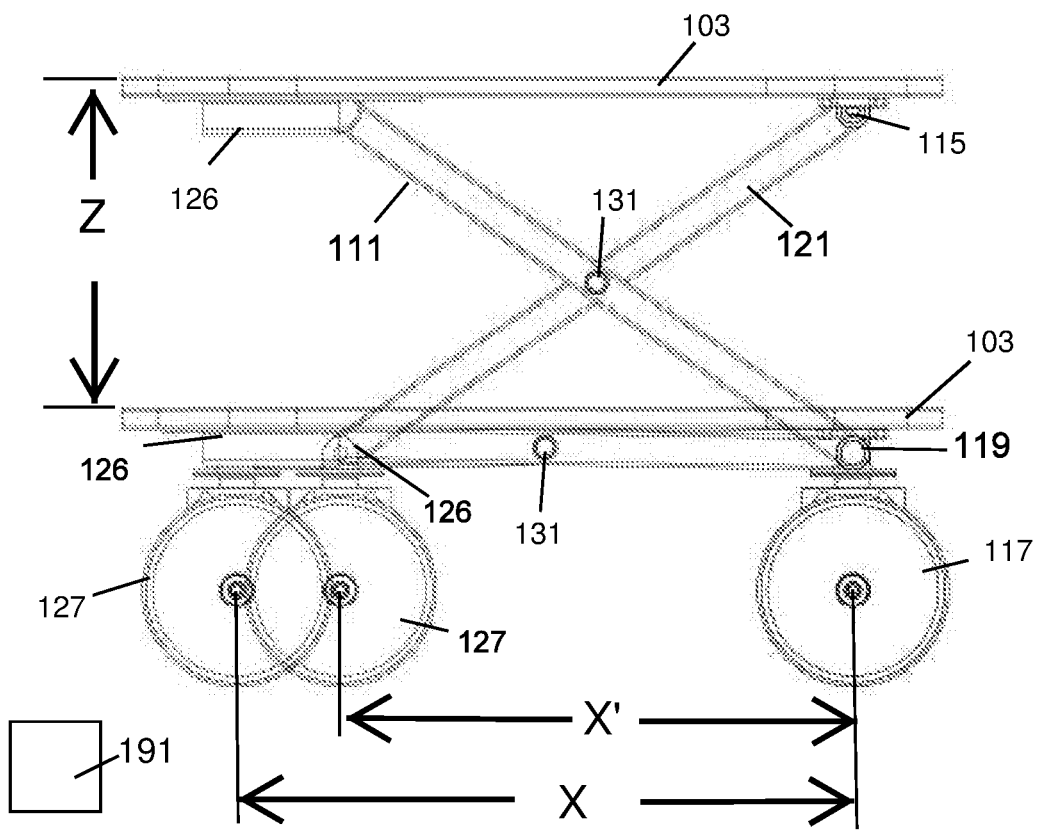
FIG. 4 illustrates a side view of a lift platform on two AGVs in lowered and raised positions.

FIG. 4 illustrates another side view of the mobile lifting apparatus 101 showing the differences between the fully raised and fully lowered positions of the platform 103. Note that AGV 117 does not move in this example as the platform 103 is in the raised and lowered configurations. The separation between the first AGV 127 and the second AGV 117 is a distance X when the platform 103 is in the lowered position which represents a maximum extended separation distance between the first AGV 127 and the second AGV 117. This distance X can be a predetermined maximum separation distance. When the platform 103 is in the fully raised position with the platform 103 at height Z, the separation between the first AGV 127 and the second AGV 117 is the distance X' which can represent a minimum separation distance.

The movements of the first AGV 127 and the second AGV 117 of a mobile lift apparatus 101 can be wirelessly controlled by an AGV controller 191. In the lowered position, the controller 191 can move the mobile lift apparatus 101 by only having the movement powered by the (lead) first AGV 127 and have the (follow) second AGV 117 simply be towed by the (lead) first AGV 127. The towing force tends to separate the second AGV 117 from the first AGV 127 and the separation distance is always X. When the controller 191 instructs the first AGV 127 and the second AGV 117 to move towards each other, the platform 103 can be raised to Z and the separation distance is X'. When the controller 191 instructs the first AGV 127 and the second AGV 117 to maintain the X' distance between each other, the platform 103 maintains raised height Z as the AGVs 117, 127 move.

A more common control scenario can be for the controller 191 to move the mobile lift apparatus 101 to a payload loading area with the platform 103 in a lowered position. The controller 191 can then move the AGVs 117, 127 towards each other to raise the platform 103 to a required height Z. The payload can be placed on the platform 103 and controller 191 can then move the AGVs 117, 127 away from each other to lower the platform 103 so the mobile lift apparatus 101 can transport the payload to the destination in a lowered more stable position. At the destination, the controller 191 can again move the AGVs 117, 127 towards each other to raise the platform 103 to a required height Z so the payload can be removed from the platform 103.

Figure 5:
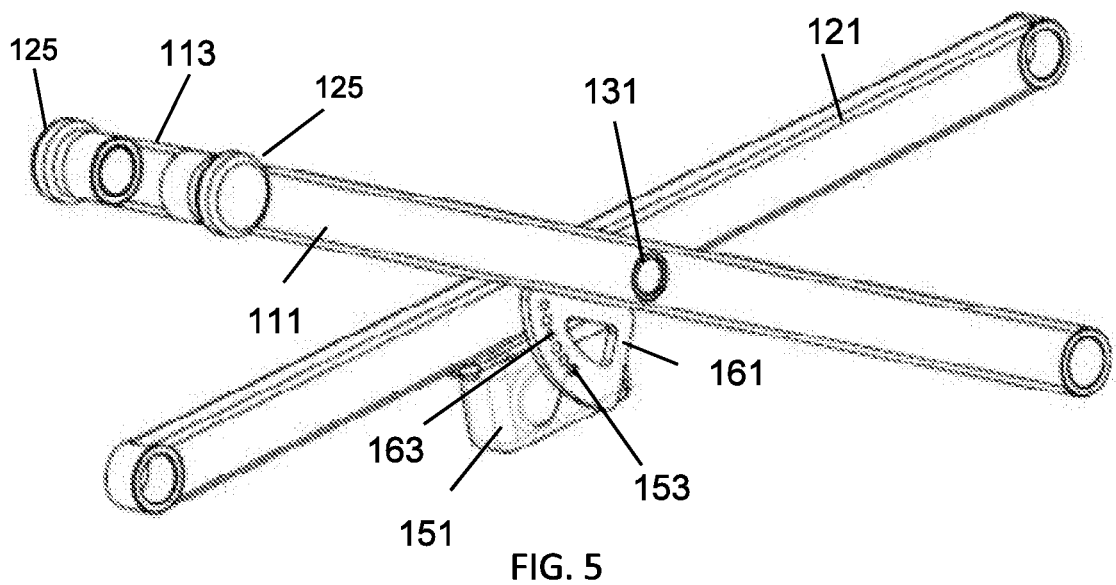
FIG. 5 illustrates a perspective view of lift arms with a locking mechanism.

FIG. 5 illustrates a perspective view of the first lift arm 121, the second lift arm 111, and the third lift arm 113. In this example, the upper ends of the second lift arm 111, and the third lift arm 113 are coupled to slides 125 which are wheels which can roll within the tracks coupled to the bottom of the platform 103. The center portions of the first lift arm 121, the second lift arm 111, and the third lift arm 113 are coupled to a hinge 131 which allows the first lift arm 121 to rotate relative to the second lift arm 111 and the third lift arm 113.

A lock mechanism 151 can be coupled to the first lift arm 121 which can extend and retract a pin 153. When the lock mechanism 151 retracts the pin 153, the first lift arm 121 can move freely in rotation relative to the second lift arm 111. In the extended position, the lock mechanism 151 can extend the pin 153 which can pass through a hole 163 which prevents the rotation of the first lift arm 121 relative to the second lift arm 111.

In an embodiment, the locking mechanism 151 is attached to the first lift arm 121 and a plate structure 161 having a plurality of holes 163 is coupled to the second lift arm 111. In the illustrated example, the plurality of holes 163 in the plate 161 can be arranged in a radial pattern with each hole 163 having the same inner diameter and each hole 163 being the same distance from the rotational center of the hinge 131. The plate 161 can be parallel to the second lift arm 111. The locking mechanism 151 can extend the pin 153 when there is a power failure and retract the pin 153 when power is available and the locking mechanism 151 is controlled to retract the pin 153. If there is a power failure with either of the supporting AGVs, the platform supported by the first lift arm 121, the second lift arm 111 and the third lift arm 113 will remain in the raised position and will not collapse. An uncontrolled collapse of a platform carrying heavy objects may damage the products on the platform, the lift mechanism, and/or the AGVs.

The placement of the pin 153 in each of the different holes 163 can each have a different locked height of the platform 103. In this example, the highest locked platform height can occur when the pin 153 is inserted in the lowest hole 163 which is the hole 163 closest to the AGV 117. Conversely, the lowest locked platform height can occur when the pin 153 is inserted in the highest hole 163 which is the hole 163 closest to the platform 103. In the fully lowered position, the locking mechanism 151 may not need to place the pin 153 in a hole 163 because the platform 103 is already in the lowest possible position and cannot fall if there is an AGV power failure.

Figure 6:
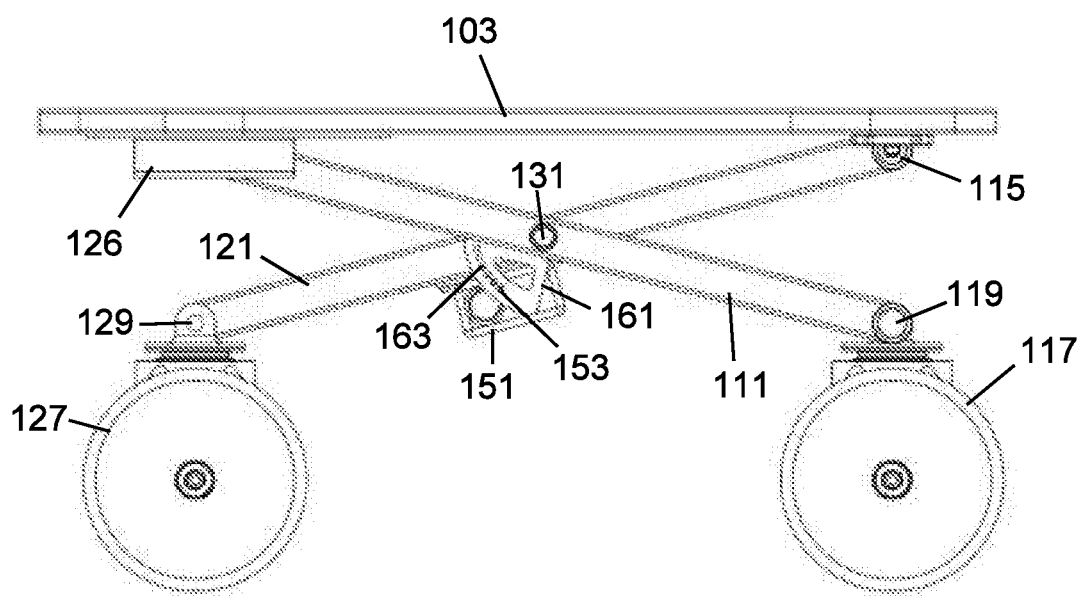
FIG. 6 illustrates a side view of a lift platform with a locking mechanism in a partially raised position on two AGVs.
Figure 7:
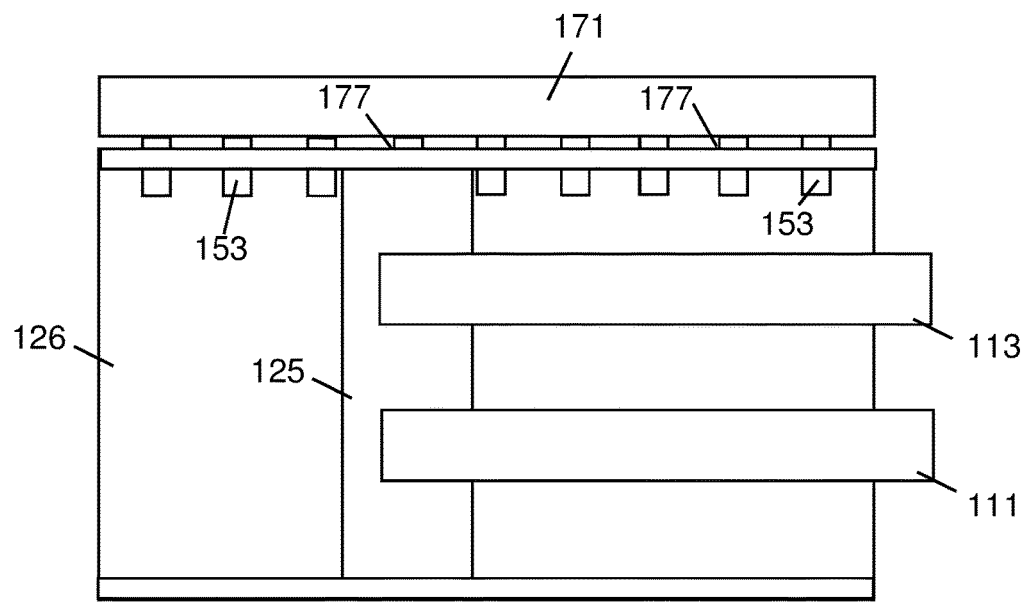
FIG. 7 illustrates a bottom view of a track with a locking mechanism.

FIG. 6 illustrates a side view of a lift mechanism coupled to the first AGV 127 and the second AGV 117, which can move in a coordinated manner with the locking mechanism 151. A specific sequence of steps can be taken to lock the platform 103 at a desired height. The locking mechanism 151 can retract the pin 153 so the locking mechanism 151 is unlocked, the first lift arm 121 can rotate relative to the second lift arm 111 about the hinge 131, and the platform 103 can move vertically.

Then the AGVs 117, 127 can be controlled to move the platform 103 to move towards each other so that they are separated by a specific distance. This controlled distance can be greater than the fully raised position and less than the fully lowered position. When the first AGV 127 and the second AGV 117 are separated by the distance that corresponds to a target platform 103 height position, the locking mechanism 151 can extend the pin 153 which can travel through the aligned hole 163 and lock the platform 103 height as described.

If the hole 163 is not aligned, the distance between the AGVs 117, 127 will need to be adjusted. In an embodiment, the locking mechanism 151 can detect when the pin 153 has been extended but has not been inserted through the hole 163. The AGV 127 can respond to this condition by moving very slowly towards or away from AGV 117 until the pin 153 is aligned with the hole 163 and the pin 153 extends into the hole 163. Once the pin 153 is inserted into the hole 163, the lifting mechanism is locked, the first lift arm 121 cannot rotate relative to the second lift arm 111 about the hinge 131, and the platform 103 will not move vertically.

The weight of objects placed on the platform 103 and the platform 103 itself will result in a shear force from the hole 163 as it tries to move out of alignment with the pin 153. Thus, in order to disengage the locking mechanism 151, the AGVs 117, 127 can be controlled to move towards each other so the first lifting arm 121 and second lifting arm 111 rotate a small amount so the pin 153 is aligned with the hole 163. Since the shear force on the pin 153 is removed, the locking mechanism 151 can then be actuated to retract the pin 153 out of the hole 163 and the first lifting arm 121 and second lifting arm 111 can rotate freely.

In another embodiment, a height locking mechanism 171 can be coupled to the track 126 and a series of holes 177 can be formed in the side of the track 126. The locking mechanism 171 can be coupled to a series of spring loaded pins 175 which are aligned with each of the holes 177. When the locking mechanism 171 is in an unlocked configuration, the pins 175 are all retracted and the slide 125 can move freely within the track 126 and the first lift arm 121 can rotate relative to the second lift arm 111 about the hinge 131. When the locking mechanism 171 is in a locked configuration, the pins 175 move into the track 126 through the unobstructed holes 177. The pins 175 that are aligned with the slide 125 will not pass into the track 126. However, the pins 175 will pass into the track 126 on opposite sides of the slide 125 and prevent movement of the slide 125 in the track 126. The inserted pins 175 will also prevent the first lift arm from rotating relative to the second lift arm about the hinge which will prevent the platform 103 from moving vertically. The locking mechanism 171 can be in the locked or unlocked configurations when power is available and in the locked configuration when power is not available.

Figure 8:
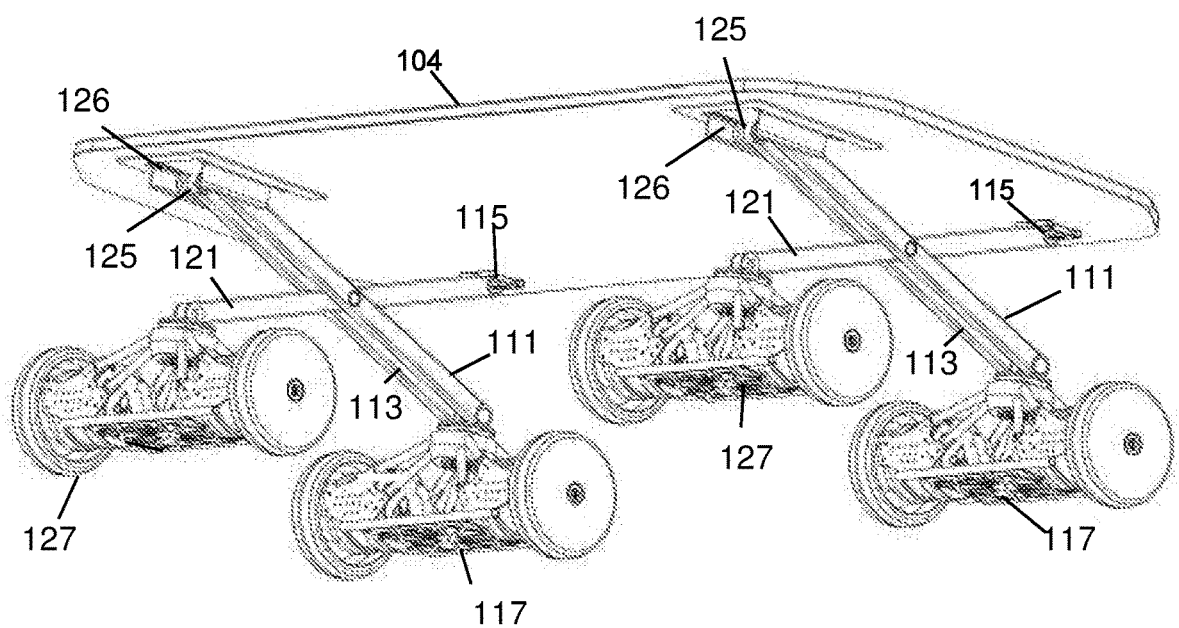
FIG. 8 illustrates a perspective view of a lift platform on four AGVs.

Although the apparatus has been described as having two AGVs which are mounted under a center line of a platform, in other embodiments with reference to FIG. 8, four or more AGVs 117, 127 can be used in a parallel configuration under a larger platform 104 which can increase the platform stability. The platform 104 can be rectangular or square in shape and the AGVs 117, 127 can be roughly positioned at each corner of the square or rectangular platform 104. The AGVs 117, 127 can be arranged so that the lift arms 111, 113, 121 of the lift mechanisms can be substantially parallel to each other. The AGVs 117, 127 can be controlled so that the opposite lift mechanisms can operate in a coordinated manner so that both sides of the platform 104 are raised and lowered simultaneously at the same rate so the platform 104 remains parallel to the ground surface throughout the vertical movements. In an embodiment, sensors such as accelerometers can be mounted on the platform to measure the horizontal alignment of the platform. If an alignment error is detected, the AGVs 117, 127 can be adjusted to correct the alignment error. Once the lift mechanisms raise the platform 104 to the desired height, the locking mechanisms can be engaged so that planar alignment of the platform 104 is easily maintained.

Figure 9:
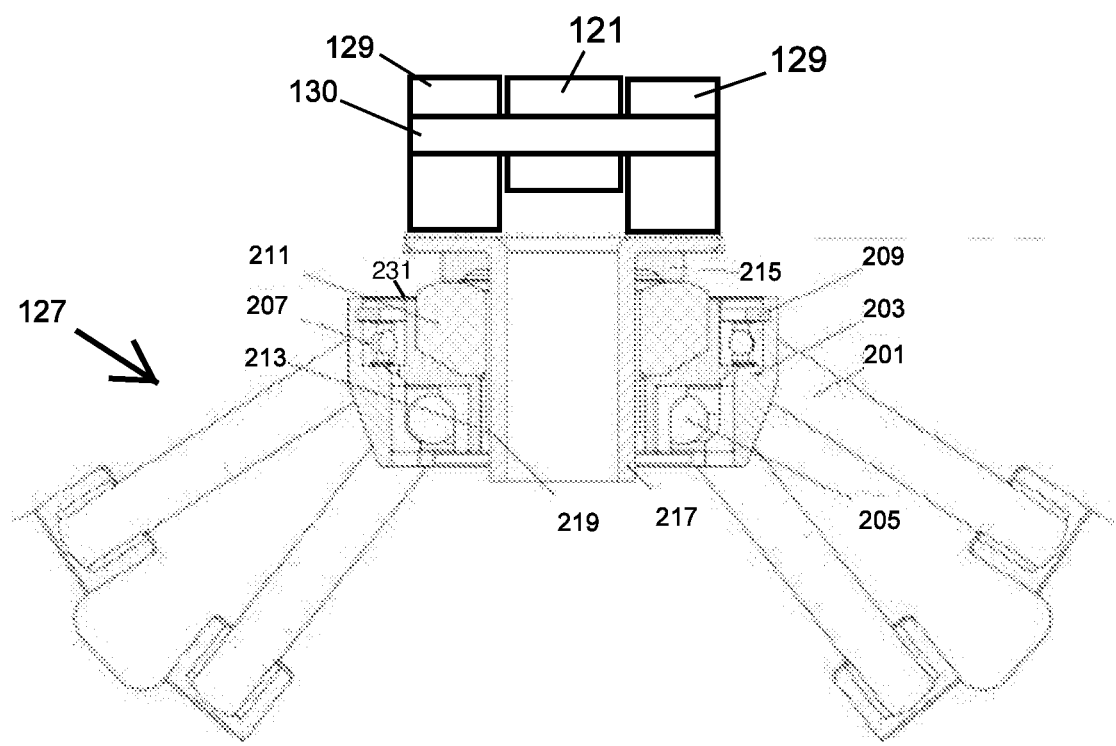
FIG. 9 illustrates a front view of a connection mechanism on an AGV.

FIG. 9 illustrates a front cross section view of an embodiment of the AGV 127 with a first lifting arm 121 coupled to a first AGV hinge 129. An axel 130 can extend through the lower end of the first lifting arm 121 and define a horizontal axis of rotation. The first AGV hinge 129 can be coupled to a vertical shaft 217 which can rotate about a vertical axis in the top of the AGV 127. The shaft 217 which can be a cylindrical structure with a cylindrical outer surface which extends downward into a head tube 203 which is coupled to an upper center portion of the AGV. In the illustrated embodiment, the head tube 203 can be bonded to the frame of the AGV.

Bearings are mounted in the head tube 203 to allow the shaft 217 to rotate smoothly. In an embodiment, an upper radial bearing 207 is mounted within the upper cylindrical surface of the head tube 203 and a lower thrust bearing 205 is mounted within the upper cylindrical surface of the head tube 203. The outer diameters of the upper radial bearing 207 can be substantially the same diameter as the inner diameter of the upper cylindrical surface of the head tube 203 and the outer diameter of the lower thrust bearing 205 can be substantially the same diameter as the inner diameter of the lower cylindrical surface of the head tube 203.

A holder cup 213 is mounted within the upper radial bearing 207 and the lower thrust bearing 205. The holder cup 213 can have an upper cylindrical surface and a lower cylindrical surface. The outer diameter of the upper cylindrical surface of the holder cup 213 can be substantially the same as the inner diameter of the upper radial bearing 207 and the outer diameter of the lower cylindrical surface of the holder cup 213 can be substantially the same as the inner diameter of the lower thrust bearing 205. A lock ring 209 can be compressed and placed within the inner diameter of the head tube 203 above the upper radial bearing 207. The lock ring 209 can then be placed in a groove formed in the inner diameter of the head tube 203 to hold the upper radial bearing 207, the holder cup 213 and the lower thrust bearing 205 in the head tube 203. In an embodiment, a dust cover 231 can be placed above the upper radial bearing 207 to prevent contamination from ambient particles. The dust cover 231 can be placed within the inner diameter of the head tube above the upper radial bearing 207 against an upper portion of the holder cup 213. In an embodiment, the holder cup 213 surrounds an elastomer 211 having an inner concave cylindrical surface. A cylindrical metal shell 219 is placed in the concave cylindrical surface of the elastomer 211 which provides a sliding surface for the shaft 217 when the AGV 127 is removed from the shaft 217, the lift mechanism and the platform 104. The lower surface of the inner diameter of the upper radial bearing can be adjacent to the protrusion to prevent holder cup 213 from being pulled upward out of the head tube 203 after the lock ring 209 has been installed in the head tube 203.

Although the AGV has been illustrated and described with the upper radial bearing 207 and the lower thrust bearing 205 as ball bearings, in other embodiments, other rotational mechanisms can be used such as bushings, needle bearings, roller bearings, roller thrust bearings, or any other mechanism which can allow the shaft 217 to rotate freely within the head tube 203 with low friction under axial and radial loads.

The present disclosure, in various embodiments, includes components, methods, processes, systems, and/or apparatus substantially as depicted and described herein, including various embodiments, subcombinations, and subsets thereof. Those of skill in the art will understand how to make and use the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease, and/or reducing cost of implementation. Rather, as the following claims reflect, inventive aspects lie in less than all features of any single foregoing disclosed embodiment.

What is claimed is:

1. A lifting apparatus comprising:
   a platform;
   a first lift arm having a first upper end coupled to a hinge on a lower surface of the platform;
   a second lift arm having a second upper end coupled to a slide which moves within a track mounted on the lower surface of the platform;
   a lift arm hinge coupled to center portions of the first lift arm and the second lift arm;
   a first automatic guided vehicle (AGV) having a first coupling attached to a first lower end of the first lift arm; and
   a second AGV having a second coupling attached to a second lower end of the second lift arm;
   wherein the lifting apparatus has a lowered configuration where the platform is lowered and a distance between the first coupling and the second coupling is maintained at a maximum predetermined distance and a raised configuration where the platform is raised and the distance between the first coupling and the second coupling is less than the maximum predetermined distance and equal to a minimum predetermined distance.

2. The lift apparatus of claim 1 further comprising:
   a rotational coupling having a vertical rotational axis between the first lower end of the first lift arm and the first AGV.

3. The lift apparatus of claim 1 further comprising:
   a rotational coupling having a vertical rotational axis between the second lower end of the second lift arm and the second AGV.

4. The lift apparatus of claim 1 wherein the slide has:
   a wheel which rolls against inner surfaces of the track; or
   bearings which roll against an inner surface of the track; or
   a low friction surface which slides against an inner surface of the track.

5. The lift apparatus of claim 1 further comprising:
   a third lift arm having a third upper end coupled to the hinge on a lower front portion of the platform and a third lower end coupled to the first AGV wherein the third lift arm is parallel to the first lift arm.

6. The lift apparatus of claim 1 further comprising:
   a third lift arm having a third upper end coupled to the slide on a lower rear portion of the platform and a third lower end coupled to the second AGV wherein the third lift arm is parallel to the second lift arm.

7. The lift apparatus of claim 1 wherein the platform has a planar upper surface.

8. The lift apparatus of claim 1 further comprising:
   a controller for controlling the movements of the first AGV and the second AGV; wherein the controller controls the first AGV and the second AGV to move the first coupling and the second coupling towards each other to raise the platform and controls the first AGV and the second AGV to move the first coupling and the second coupling away from each other to the maximum predetermined distance to fully lower the platform.

9. The lift apparatus of claim 1 further comprising:
   a controller for controlling the movements of the first AGV and the second AGV;
   wherein the controller controls the first AGV and the second AGV to move independently while maintaining a predetermined distance between the first coupling and the second coupling.

10. The lift apparatus of claim 1 further comprising:
    a controller for controlling the movements of the first AGV and the second AGV; wherein the controller controls the first AGV and the second AGV to move independently while maintaining a fixed distance between the first coupling and the second coupling that is less than the maximum predetermined distance.

11. The lift apparatus of claim 1 further comprising:
a third lift arm having a third upper end coupled to the lower surface of the platform;
a fourth lift arm having a fourth upper end coupled to a second slide on the lower surface of the platform;
a second lift arm hinge coupled to center portions of the third lift arm and the fourth lift arm;
a third automatic guided vehicle (AGV) having a third coupling attached to a third lower end of the third lift arm; and
a fourth AGV having a fourth coupling attached to a fourth lower end of the fourth lift arm.

12. The lift apparatus of claim 11 further comprising:
a controller for controlling the movements of the first AGV, the second AGV, the third AGV and the fourth AGV;
wherein the controller controls the first AGV and the second AGV to maintain a fixed distance between the first coupling and the second coupling and the controller controls the third AGV and the fourth AGV to maintain the fixed distance between the third coupling and the fourth coupling.

13. The lift apparatus of claim 1 further comprising:
a locking mechanism coupled to the first lift arm and the second lift arm wherein the locking mechanism has a locked position that prevents the first lift arm from rotating relative to the second lift arm about the hinge and the locking mechanism has an unlocked position that allows the first lift arm to rotate relative to the second lift arm about the hinge.

14. The lift apparatus of claim 1 further comprising:
a locking mechanism coupled to the track wherein the locking mechanism has a locked position that prevents the slide and the second lift arm from moving relative to the platform and an unlocked position which allows the slide and the second lift arm to move relative to the platform.

15. The lift apparatus of claim 13, wherein the locking mechanism includes a plurality of holes and a pin, the pin is inserted through one of the plurality of holes in the locked position and the pin is retracted in the unlocked position.

16. The lift apparatus of claim 14, wherein the locking mechanism includes a plurality of holes and a pin, the pin is inserted through one of the plurality of holes in the locked position and the pin is retracted in the unlocked position.

* * * * *